(12) United States Patent
Chen

(10) Patent No.: US 7,513,651 B2
(45) Date of Patent: Apr. 7, 2009

(54) BACKLIGHT MODULE INCLUDING HEAT PIPE WITH NANO-SCALED RECESSES

(75) Inventor: Ga-Lane Chen, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 123 days.

(21) Appl. No.: 11/437,195

(22) Filed: May 18, 2006

(65) Prior Publication Data
US 2006/0262571 A1 Nov. 23, 2006

(30) Foreign Application Priority Data
May 18, 2005 (CN) .................. 200510034718.3

(51) Int. Cl.
*F28D 15/04* (2006.01)
*F21V 29/00* (2006.01)
(52) U.S. Cl. .............. 362/294; 362/373; 165/104.33; 165/104.26; 165/204.21
(58) Field of Classification Search ............ 362/580, 362/547, 294, 373, 264; 165/104.26, 104.21, 165/104.33
See application file for complete search history.

(56) References Cited

U.S. PATENT DOCUMENTS

| | | | |
|---|---|---|---|
| 4,004,441 A * | 1/1977 | Leszak | 165/104.26 |
| 5,179,043 A * | 1/1993 | Weichold et al. | 165/104.26 |
| 6,432,320 B1 * | 8/2002 | Bonsignore et al. | 165/104.19 |
| 6,880,956 B2 * | 4/2005 | Zhang | 362/264 |
| 6,994,152 B2 * | 2/2006 | Rosenfeld et al. | 165/104.26 |
| 7,011,146 B2 * | 3/2006 | Wong | 165/104.26 |
| 7,198,386 B2 * | 4/2007 | Zampini et al. | 362/294 |
| 2003/0086454 A1 * | 5/2003 | Nagano et al. | 372/35 |
| 2003/0214803 A1 * | 11/2003 | Ono et al. | 362/1 |
| 2005/0238810 A1 * | 10/2005 | Scaringe et al. | 427/249.1 |
| 2006/0092639 A1 * | 5/2006 | Livesay et al. | 362/294 |
| 2006/0133090 A1 * | 6/2006 | Noh et al. | 362/294 |
| 2006/0201655 A1 * | 9/2006 | Hong et al. | 165/104.26 |

FOREIGN PATENT DOCUMENTS

| | | |
|---|---|---|
| CN | 1567064 A | 1/2005 |
| JP | 11-202800 A | 7/1999 |

* cited by examiner

*Primary Examiner*—Ismael Negron
(74) *Attorney, Agent, or Firm*—Andrew C. Cheng

(57) ABSTRACT

A backlight module includes a reflective plate, a light module and a heat dissipation module. The light module and the heat dissipation module are disposed at two sides of the reflective plate. The light module has a number of light emitting diodes to emit light. The heat dissipation module includes at least one heat pipe, a heat sink and a fan on an end of the heat sink. The heat pipes are disposed between the reflective plate and the heat sink to transfer the heat generated by the light module. The at least one heat pipe defines a number of nano-scale recesses in an inner surface thereof.

10 Claims, 5 Drawing Sheets

BACKLIGHT MODULE INCLUDING HEAT PIPE WITH NANO-SCALED RECESSES

BACKGROUND

1. Technical Field

The invention relates generally to backlight modules, and in particular to a backlight module with uniform brightness and a high heat dissipating efficiency. The invention also relates to a method for manufacturing a backlight module.

2. Related Art

Liquid crystal display devices are commonly used as display devices for compact electronic apparatuses such as digital cameras, personal digital assistants (PDAs), navigation satellite global positioning systems (GPSs), computer monitors, flat panel televisions (TVs) and so on. Because liquid crystals in the liquid crystal display device do not emit any light themselves, it is common for a backlight module to be disposed in the liquid crystal display device. The backlight module illuminates a liquid crystal panel of the liquid crystal display device, and the panel can thereby display clear images.

Referring to FIG. 8, a conventional liquid crystal display device 10 comprises a liquid crystal panel 20 and a backlight module 40 disposed below the liquid crystal panel 20. The backlight module 40 comprises a light source, a diffusing plate 42, a light guide plate 43, a reflective plate 44, and a housing 45. The light source has a plurality of cold cathode fluorescent lamps (CCFLs) 41 in an airtight cabinet, and is for emitting light toward the light guide plate 43. The diffusing plate 42 is interposed between the liquid crystal panel 20 and the light source, and is for diffusing received light. The light guide plate 43 is interposed between the diffusing plate 42 and the light source, and is for scattering light toward the diffusing plate 42. The reflective plate 44 is disposed below the light source. The reflective plate 44 is for reflecting at least some (and preferably nearly all) of light that is emitted from bottom and side portions of the light source back into the light guide plate 43. This reflection enhances the utilization ratio of the light. The housing 45 is disposed below the reflective plate 44, and is for assembling the reflective plate 44, the light source, the light guide plate 43 and the diffusing plate 42 onto the liquid crystal panel 20. Furthermore, a prism sheet 46 is disposed on the diffusing plate 42. The prism sheet 46 is for improving the illumination of the light that transmits to the liquid crystal panel 20.

In the typical configuration of the liquid crystal display device 10 having the backlight module 40, the CCFLs 41 are arranged in a discontinuous parallel manner. Each of the CCFLs 41 is a linear light source, which emits light by means of cathode ray stimulation of fluorescent material therein. Referring to FIG. 9, the brightness of areas of the liquid crystal display device 10 relatively far away from the CCFLs 41 (shown by broken lines) is less than that of areas nearer the CCFLs 41. Thus, a dark area 47 is likely to be formed between each two adjacent CCFLs 41. Furthermore, in order to satisfy the requirement of high brightness, a large number of the CCFLs 41 is generally disposed in the airtight cabinet. Heat generated by the CCFLs 41 may not be dissipated efficiently. This can cause problems such as unstable images and a reduced useful working lifetime of the liquid crystal display device 10.

What is needed, therefore, is a backlight module that provides uniform brightness and has a high heat dissipating efficiency.

What is also needed is a method for manufacturing the above-described backlight module.

SUMMARY

In one embodiment, a backlight module includes a reflective plate, and a light module and a heat dissipation module. The light module and the heat dissipation module are disposed at two sides of the reflective plate respectively. The light module has a number of light emitting diodes to emit light. The heat dissipation module includes at least one heat pipe, a heat sink and a fan on an end of the heat sink. The at least one heat pipe is disposed between the reflective plate and the heat sink to transfer the heat generated by the light module. The at least one heat pipe defines a number of nano-scale recesses in an inner surface thereof to improve the heat dissipation capability thereof.

In another embodiment, a method for making the above-mentioned backlight module generally includes the steps of:

providing a sheet;

forming a number of nano-scaled recesses in the sheet by a nano-imprinting process;

wrapping the sheet to form at least one tube with the recesses located in inside the at least one tube by a punching process;

vacuumizing the at least one tube, filling working fluid into the at least one tube, and hermetically sealing the at least one tube to obtain at least one heat pipe;

attaching the at least one heat pipe to a heat sink by a welding process to obtain the heat dissipation module; and assembling the heat dissipation module and a light module onto two side portions of a reflective plate to obtain the backlight module.

Furthermore, the nano imprinting process generally includes a nickel (Ni) mold formation process and a hot embossing lithography process. The Ni mold is generally made by either of the following two methods.

One of the methods for making the Ni mold includes:

providing a substrate made of a material selected from silicon and silicon dioxide;

applying a photo-resist layer on the substrate by a spin-coating process;

placing a photomask with a given pattern on the substrate, the pattern being configured corresponding to dots of the Ni mold to be formed, and applying radiation in the form of laser light or UV (ultraviolet) light to the exposed photo-resist;

removing the photomask;

applying a gold layer on the substrate;

applying a nickel layer on the gold layer;

removing the substrate by a dissolving process; and removing remaining photo-resist by an etching process to thereby obtain the Ni mold with the gold layer.

The other method for making the Ni mold includes:

providing a substrate made of nickel (Ni);

applying a photo-resist layer on the substrate;

placing a photomask with a given pattern on the substrate, the pattern being configured corresponding to dots of the Ni mold to be formed, and applying radiation in the form of laser light or UV (ultraviolet) light to the exposed photo-resist; and removing remaining photo-resist by an etching process thereby obtain the Ni mold.

Other advantages and novel features of the present backlight module and method for making the same will become more apparent from the following detailed description of preferred embodiments when taken in conjunction with the accompanying drawings.

BRIEF DESCRIPTION OF THE DRAWINGS

The components in the drawings are not necessarily to scale, the emphasis instead being placed upon clearly illustrating the principles of the present backlight module and the related manufacturing method.

Figure 1:
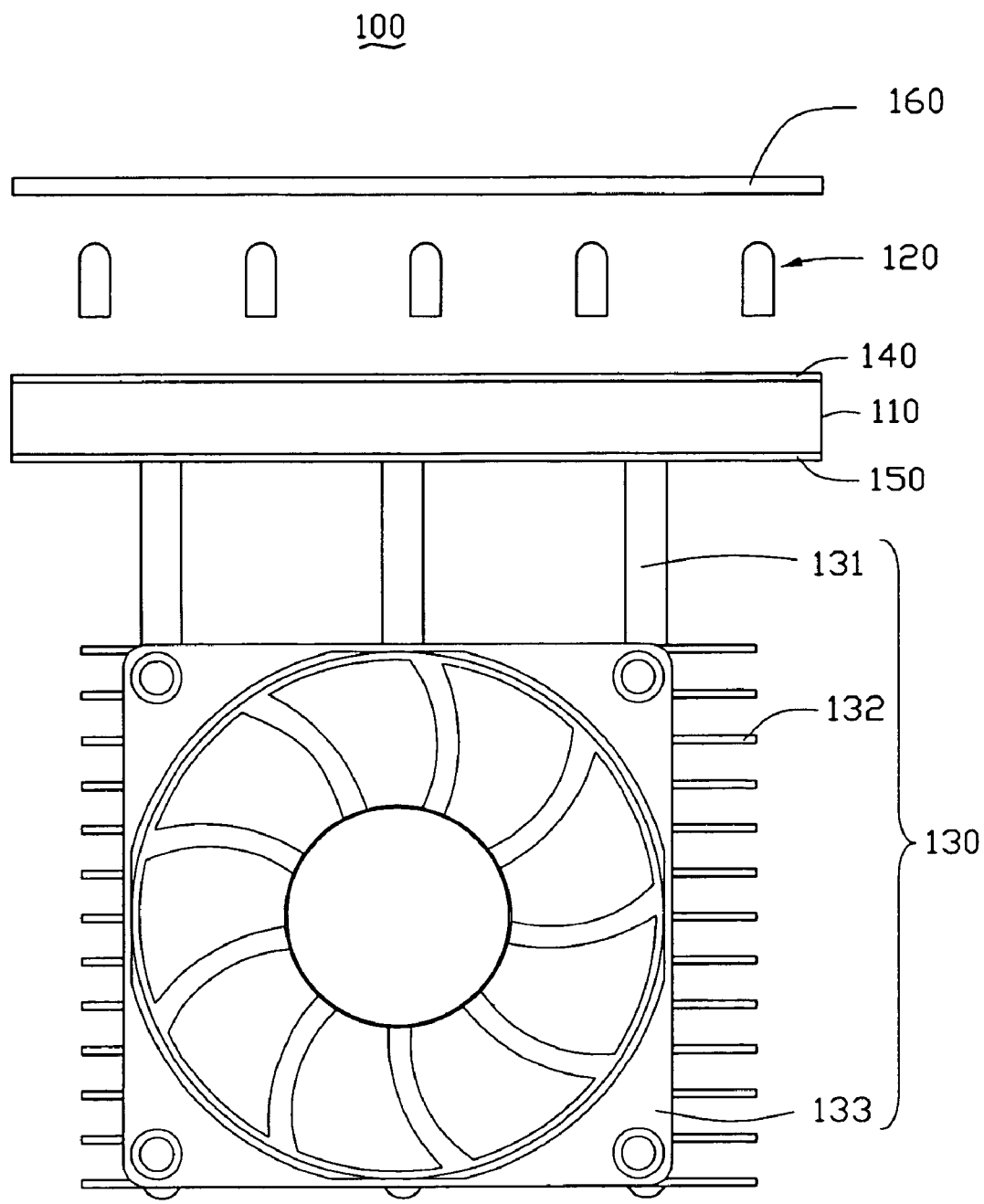
FIG. 1 is a side view of a backlight module in accordance with an exemplary embodiment of the present invention.

Corresponding reference characters indicate corresponding parts throughout the several views. The exemplifications set out herein illustrate at least one preferred embodiment of the present backlight module and the related manufacturing method, in one form, and such exemplifications are not to be construed as limiting the scope of the invention in any manner.

DETAILED DESCRIPTION

Reference will now be made to the drawings to describe embodiments of the present backlight module and the related manufacturing method in detail.

Referring to FIG. 1, a backlight module 100 in accordance with an exemplary embodiment of the present invention is illustrated. The backlight module 100 is generally used as a light source in a liquid crystal display device. The backlight module 100 generally comprises a reflective plate 110, a light module 120, and a heat dissipation module 130. The light module 120 and the heat dissipation module 130 are disposed at two opposite sides of the reflective plate 110 respectively.

Figure 2:
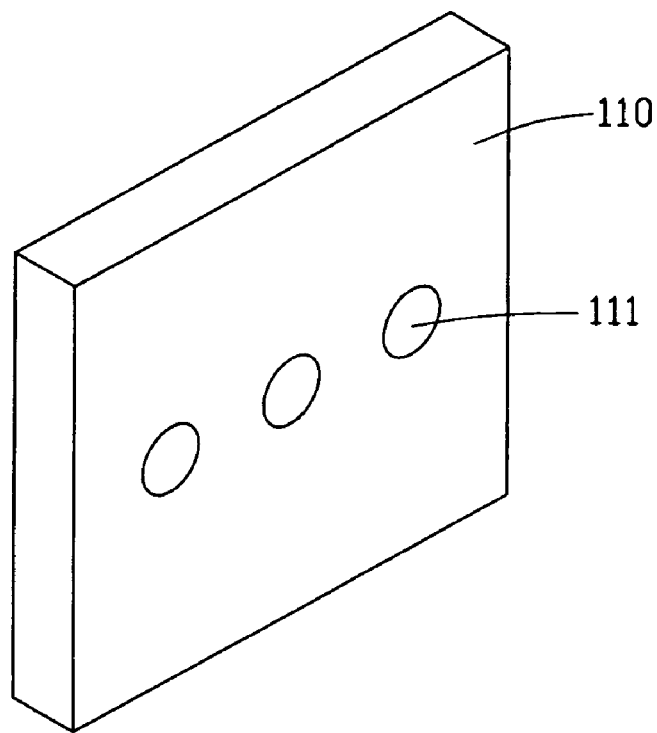
FIG. 2 is an isometric view of a reflective plate of the backlight module of FIG. 1.

Referring also to FIG. 2, the reflective plate 110 is generally made of a material selected from the group consisting of copper (Cu), aluminum (Al), and alloys substantially composed of at least two such metals. Preferably, the reflective plate 110 is made of Al. At least one cavity 111 is defined in a bottom portion of the reflective plate 100, the cavity 111. In FIG. 2, three cavities 111 are provided in the reflective plate 100. Each of the cavities 111 is generally cylindrical, conical, hemispherical, or partially hemispherical. As shown in FIG. 2, the cavities 111 are preferably generally cylindrical.

Preferably, a first layer 140 is formed on a top surface of the reflective plate 110 by, for example, a direct current magnetron sputtering method. The first layer 140 is used to reflect the light received from the light module 120 back into a liquid crystal panel (not shown) that is typically used with the backlight module 100. This reflection enhances the utilization ratio of the light. A thickness of the first layer 140 is preferably in the range from about 100 nm to about 1,000 nm. The first layer 140 is generally made of a metallic material with high heat conductivity, such as silver (Ag), aluminum (Al), copper (Cu), or an alloy substantially composed of at least two such metals. The first layer 140 is preferably made of Ag.

Preferably, a second layer 150 is formed on a bottom surface of the reflective plate 110 by, for example, a direct current magnetron sputtering method. The second layer 150 is used for improving a heat transfer characteristic of the reflective plate 110. A thickness of the second layer 150 is preferably in the range from about 100 nm to about 1,000 nm. The second layer 150 is generally made of a metallic material with high heat conductivity, such as silver (Ag), aluminum (Al), copper (Cu), or an alloy substantially composed of at least two such metals. The second layer 150 is preferably made of Cu.

The light module 120 comprises a number of light emitting diodes (LEDs) (not labeled). Each light emitting diode has several kinds of color sub-pixels (i.e., red, green, and blue). The number of light emitting diodes is preferably in the range from about 30,000 to about 50,000. The light emitting diodes are distributed in a uniform array; thus the light emitted by the light emitting diodes collectively forms a continuous, uniform area of light. Therefore the light energy, the brightness and the color of the liquid crystal panel can be optimized.

Furthermore, a diffusing plate 160 is disposed at a top side of the light module 120. That is, the diffusing plate 160 is opposite to the reflective plate 110. The diffusing plate 160 is used to diffuse the light emitted from the light emitting diodes.

The heat dissipation module 130 generally comprises at least one heat pipe 131, a heat sink 132, and a fan 133. The heat sink 132 has a plurality of heat fins (not labeled) arranged parallel to each other. Each of the heat fins is oriented perpendicular to the heat pipes 131. The fan 133 is preferably disposed on the heat sink 132 generally between inner ends of the heat fins, in order to improve a heat dissipation capability of the heat dissipation module 130.

Figure 3:
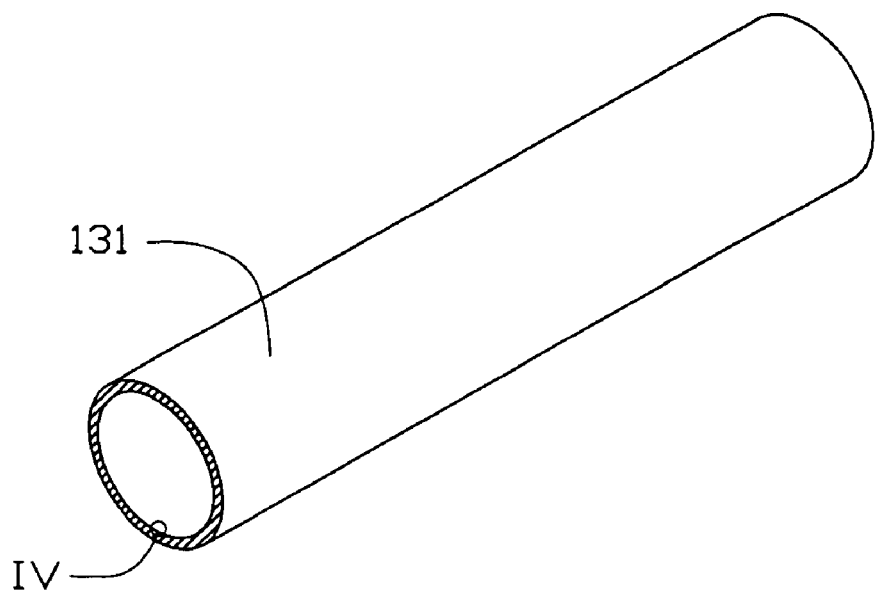
FIG. 3 is an enlarged, isometric, cut-away view of part of one of heat pipes of the backlight module of FIG. 1.
Figure 4:
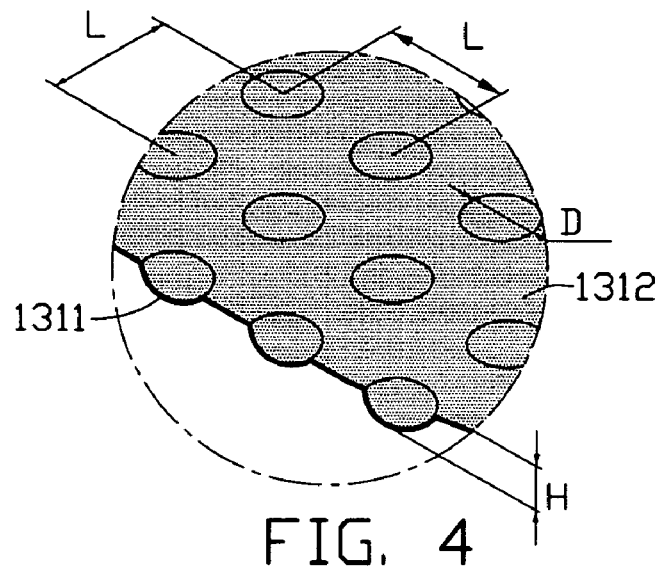
FIG. 4 is an enlarged view of a circled portion IV of FIG. 3.

Referring to FIGS. 3 and 4, three parallel heat pipes 131 are provided in the heat dissipation modules 130. Each of the heat pipes 131 is preferably made of a metallic material such as copper (Cu), aluminum (Al), iron (Fe), stainless steel, or an alloy substantially composed of at least two such metals, The heat pipe 131 has a heat-receiving end (not labeled), and a heat-emitting end (not labeled) opposite to the heat-receiving end. The heat-receiving end of the heat pipe 131 is received in a corresponding cavity 111 of the reflective plate 110. The heat-receiving end of the heat pipe 131 is closed, and is preferably in the form of a solid block. Thereby, the heat-receiving end has a flat surface contacting the reflective plate 110, which increases a heat transferring area of the heat-receiving end. A plurality of nano-scaled recesses 1311 is defined in an inner surface of each heat pipe 131. The recesses 1311 are used for providing a capillarity function to improve the mobility of working fluid (now shown) that is retained in the heat pipe 131. Thus the recesses 1311 increase the heat dissipation capability of the heat pipe 131. A cross-section of each of the recesses 1311 taken along a direction perpendicular to the inner surface of the heat pipe 131 is generally rectangular, V-shaped, U-shaped, curved, arcuate, arc-shaped, or trapezoidal. As shown in FIG. 4, the cross-section of each recess 1311 is preferably arc-shaped. A diameter D and a depth H of the recess 1311 are each generally in the range from about 2 nm to about 50 nm. Preferably, the diameter D and depth H of the recess 1311 are each in the range from about 10 nm to about 40 nm. The recesses 1311 are distributed in a generally uniform array, thereby defining a pitch L between each two adjacent recesses 1311. The pitch L is generally in the range from about 2 nm to about 50 nm. Preferably, the pitch L is in the range from about 10 nm to about 40 nm.

Each fully-assembled heat pipe 131 is closed at both ends thereof, so that the heat pipe 131 has a vacuum airtight configuration with the working fluid contained therein. Generally, the working fluid is selected from a liquid material such as water, ammonia, methyl alcohol, acetone, heptane, and so on. Furthermore, a plurality of particles (now shown) is optionally suspended in the working fluid, for improving a heat dissipation capability of the heat pipe 131. The particles are generally made of a high heat conduction material such as copper, nanotubes, nanowires, nanoballs, or an admixture substantially composed of at least two such materials.

Furthermore, a third layer 1312 is optionally formed on the inner surface of each heat pipe 131 by, for example, a sputtering method or an evaporation method. This can increase the heat dissipation capability of the heat pipe 131. The third layer 1312 is comprised of nano-scaled particles. The nano-scaled particles are generally made of a material selected from the group consisting of silicon (Si), silicon dioxide ($SiO_2$), aluminum trioxide ($Al_2O_3$), and admixtures substantially composed of at least two such materials. A thickness of the third layer 1312 is generally in the range from about 1 nm to about 20 nm. Preferably, the thickness is in the range from about 2 nm to about 10 nm.

Figure 5:
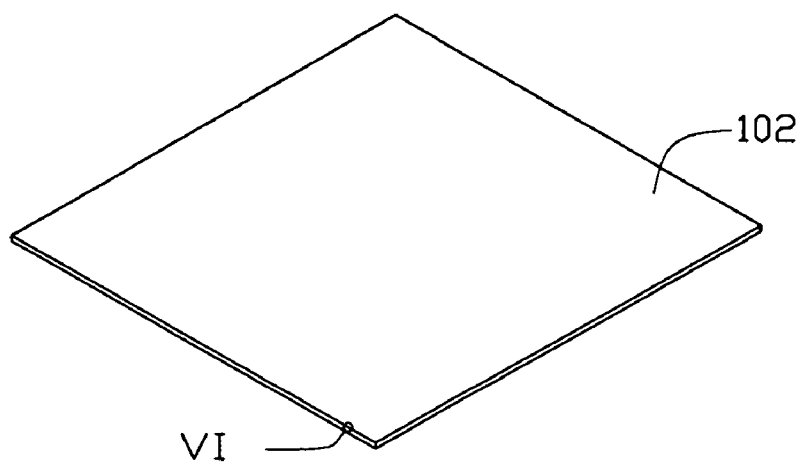
FIG. 5 is an isometric view of a sheet that is used to make the heat pipe of FIG. 3.
Figure 6:
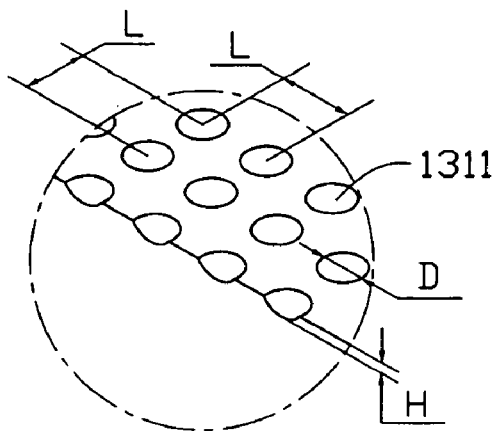
FIG. 6 is an enlarged view of a circled portion VI of FIG. 5.

Referring also to FIGS. 5 and 6, a method for making the above-mentioned backlight module 100 generally includes the steps of:

(a) providing a sheet 102;
(b) forming a plurality of nano-scaled recesses 1311 in the sheet 102 by, for example, a nano-imprinting process;
(c) wrapping the sheet 102 to form at least one tube with the recesses 1311 located in inner portions thereof by, for example, a punching process;
(d) vacuumizing the at least one tube, filling working fluid into the at least one tube, and hermetically sealing the at least one tube to obtain at least one heat pipe 131;
(e) attaching the at least one heat pipe 131 onto a heat sink 132 and a fan 133 by, for example, a welding process, to thereby obtain the heat dissipation module 130; and
(f) assembling the heat dissipation module and a light module 120 onto two opposite side portions of a reflective plate 110, to thereby obtain the backlight module 100.

In step (a), the sheet 102 is preferably made of a metallic material, such as copper (Cu), aluminum (Al), iron (Fe), stainless steel, or an alloy substantially composed of at least two such metals.

In step (b), the nano-imprinting process generally includes a nickel (Ni) mold formation process and a hot embossing lithography process. The Ni mold formed in the Ni mold formation process has a given pattern that generally includes a plurality of nano-scaled dots corresponding to the nano-scaled recesses 1311 of the heat pipes 131. Each of a diameter and a depth of each of the dots is generally in the range from about 2 nm to about 50 nm, and preferably in the range from about 10 nm to about 40 nm. A pitch between each two adjacent dots is generally in the range from about 2 nm to 50 nm, and preferably in the range from about 10 nm to about 40 nm. The Ni mold is generally made by either of the following two methods.

One of the methods for making the Ni mold includes the steps of:

(i) providing a substrate made of a material such as silicon, silicon dioxide, and so on;
(ii) applying a photo-resist layer on the substrate by a spin-coating process;
(iii) placing a photomask with a given pattern on the substrate, the pattern being configured corresponding to the dots of the Ni mold to be formed, and applying radiation in the form of laser light or UV (ultraviolet) light to the exposed photo-resist;
(iv) removing the photomask;
(v) applying a gold layer on the substrate;
(vi) applying a nickel layer on the gold layer;
(vii) removing the substrate by a dissolving process; and
(viii) removing remaining photo-resist portions by an etching process, such as an electron beam etching process, a reactive ion etching process, and so on, to thereby obtain the Ni mold.

The other method for making the Ni mold includes the steps of:

(i') providing a substrate made of nickel (Ni);
(ii') applying a photo-resist layer on the substrate;
(iii') placing a photomask with a given pattern on the substrate, the pattern being configured corresponding to the dots of the Ni mold to be formed, and applying radiation in the form of laser light or UV (ultraviolet) light to the exposed photo-resist; and
(iv') removing remaining photo-resist by an etching process, such as an electron beam etching process, a reactive ion etching process, and so on, to thereby obtain the Ni mold.

In the hot embossing lithography process, the sheet 102 is firstly heated to a predetermined temperature (e.g. over 200° C. for an aluminum sheet, over 300° C. for an sliver sheet). The Ni mold with the dots is pressed on a hot surface of the sheet 102 to form a plurality of nano-scaled recesses 1311 in the sheet 102. Corresponding to the dots of the Ni mold, each of a diameter D and a depth H of each recess 1311 is generally in the range from about 2 nm to about 50 nm. The diameter D and depth H of the recess 1311 are each preferably in the range from about 10 nm to about 40 nm. A pitch L between each two adjacent recesses 1311 is generally in the range from about 2 nm to about 50 nm. Preferably, the pitch L is in the range from about 10 nm to about 40 nm. The Ni mold and the sheet 102 are then cooled to room temperature, and the Ni mold is detached from the sheet 102 to obtain the sheet 102 with the recesses 1311.

Furthermore, a third layer 1312 is optionally formed on the side of the sheet 102 having the recesses 1311 by, for example, a sputtering method or an evaporation method. The third layer 1312 is for increasing the heat dissipation capability of the at least one heat pipe 131. The third layer 1312 is comprised of nano-scaled particles. The nano-scaled particles are generally made of a material selected from the group consisting of silicon (Si), silicon dioxide ($SiO_2$), aluminum trioxide ($Al_2O_3$), and admixtures substantially composed of at least two such materials. A thickness of the third layer 1312 is generally in the range from about 1 nm to about 20 nm. Preferably, the thickness is in the range from about 2 nm to about 10 nm.

In step (c), if the size of the tube formed by the sheet 102 does not consist with the size of the desired heat pipe 131 or heat pipes 131, a further step of cutting the sheet 102 into a plurality of pieces before step (c) or cutting the tube into a plurality of short tubes after step (c) can be performed.

In step (d), the working fluid used in the tubes is preferably selected from a liquid material such as water, ammonia, methyl alcohol, acetone, heptane, and so on. Furthermore, a plurality of particles (now shown) is optionally suspended in the working fluid, for improving a heat dissipation capability of the heat pipe 131. The particles are generally made of a high heat conduction material such as copper, nanotubes, nanowires, nanoballs, or an admixture substantially composed of at least two such materials.

In step (f), a first layer 140 is optionally formed on a top surface of the reflective plate 110 by, for example, a direct current magnetron sputtering method. A thickness of the first layer 140 is preferably in the range from about 100 nm to about 1,000 mm. The first layer 140 is generally made of a metallic material with high heat conductivity, such as silver (Ag), aluminum (Al), copper (Cu), or an alloy substantially composed of at least two such metals. The first layer 140 is preferably made of Ag.

A second layer 150 is also optionally formed on a bottom surface of the reflective plate 110 by, for example, a direct current magnetron sputtering method. A thickness of the second layer 150 is preferably in the range from about 100 mm to about 1,000 nm. The second layer 150 is generally made of a metallic material with high heat conductivity, such as silver (Ag), aluminum (Al), copper (Cu), or an alloy substantially composed of at least two such metals. The second layer 150 is preferably made of Cu.

Figure 7:
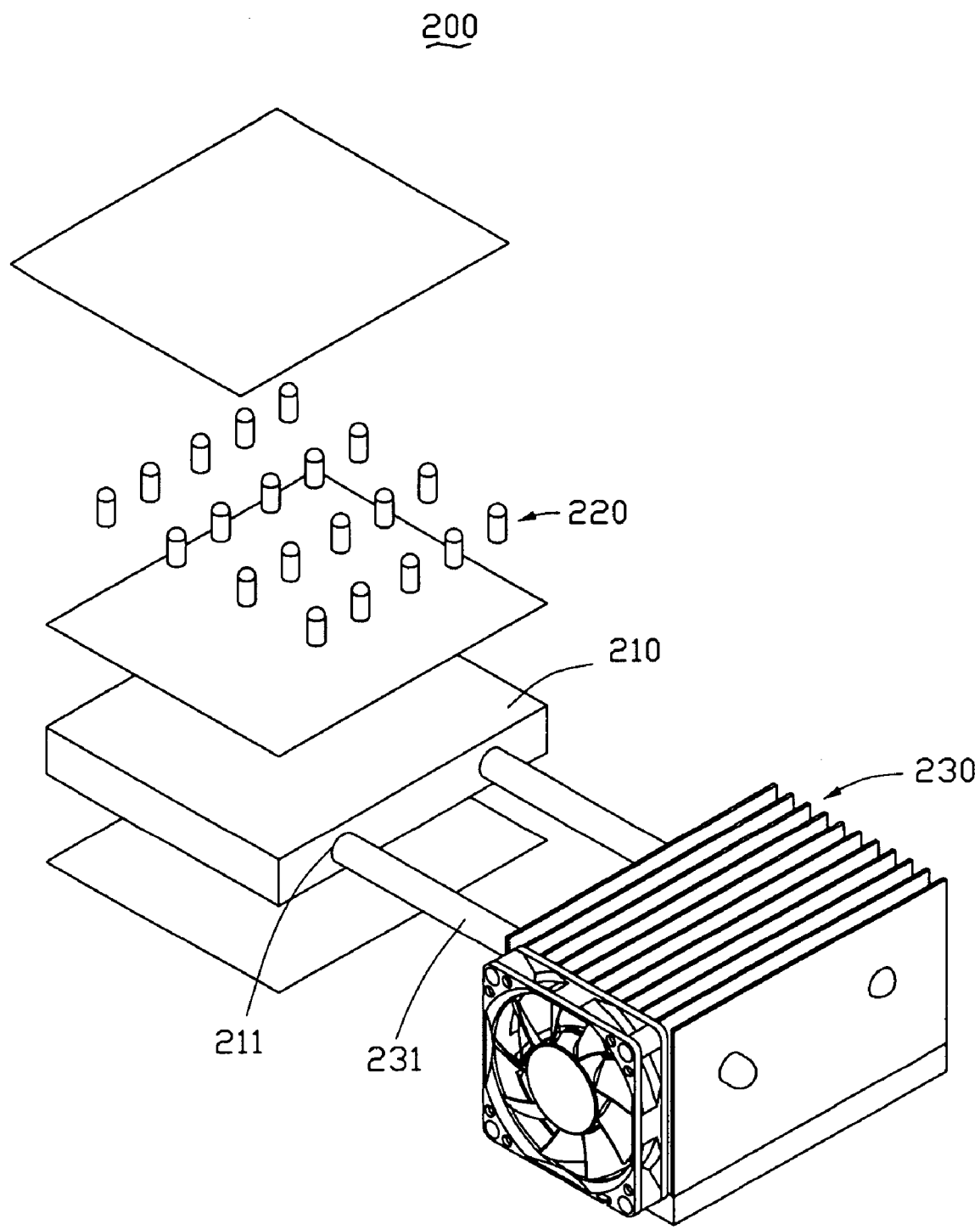
FIG. 7 is a partially exploded, isometric view of a backlight module in accordance with another exemplary embodiment of the present invention.
Figure 8:
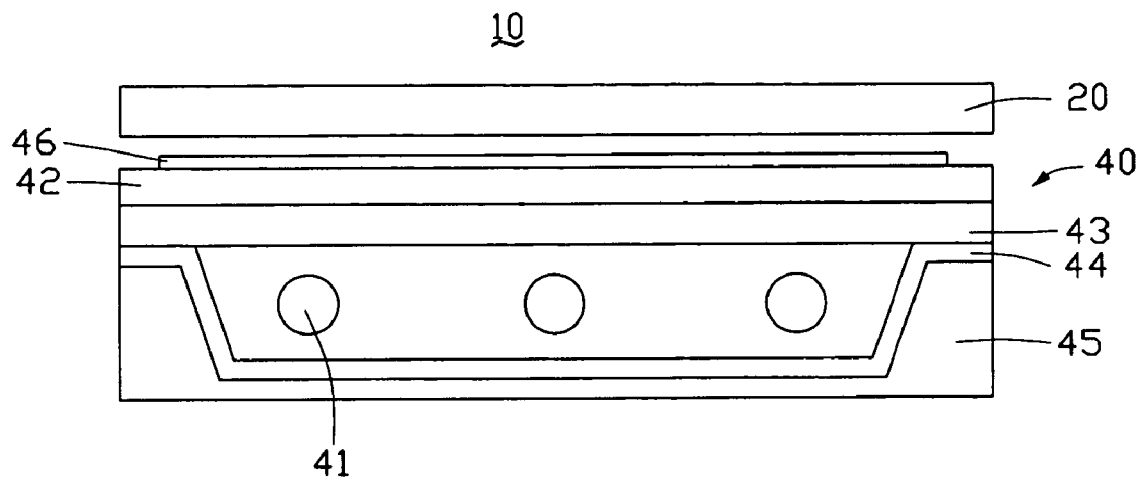
FIG. 8 is a schematic, side view of a conventional liquid crystal display device.
Figure 9:
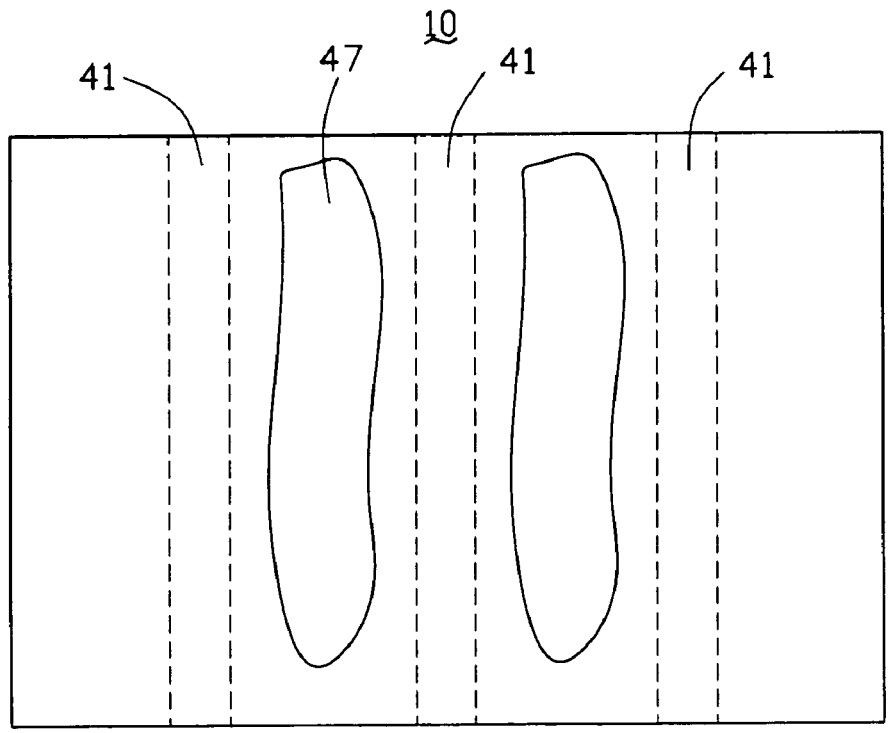
FIG. 9 is a top plan view of the liquid crystal display device of FIG. 8, showing dark areas of light distribution formed between each two adjacent CCFLs thereof.

Referring to FIG. 7, another type of backlight module 200 in accordance with another exemplary embodiment of the present invention is illustrated. The backlight module 200 comprises a light module 220, a reflective plate 210, and a heat dissipation module 230. Each of the light module 220, the reflective plate 210 and the heat dissipation module 230 has a configuration essentially the same as that of the above-described light module 120, reflective plate 110 and heat dissipation module 130 respectively. In addition, a method for making the backlight module 200 is essentially the same as the above-described manufacturing method for the backlight module 100. The difference between the backlight module 200 and the backlight module 100 is that in the backlight module 200, the light module 220 and the heat dissipation module 230 are disposed at two adjacent sides of the reflective plate 210. Correspondingly, a plurality of cavities 211 is defined in a side portion of the reflective plate 210. Heat-receiving ends of a plurality of heat pipes 231 are received in the cavities 211 when the heat dissipation module 230 is attached to the reflective plate 210. The light module 220 is attached onto a top portion of the reflective plate 210.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

I claim:

1. A backlight module comprising:
   a reflective plate;
   a light module disposed at a first side portion of the reflective plate; and
   a heat dissipation module disposed at a second side portion of the reflective plate, the heat dissipation module comprising:
   a heat sink; and
   at least one heat pipe attached between the reflective plate and the heat sink, the at least one heat pipe defining a plurality of nano-scaled recesses in an inner surface thereof, the recesses extending along a direction perpendicular to the inner surface of the heat pipe.

2. The backlight module as claimed in claim 1, wherein at least one heat conductive layer is formed on at least one of surfaces of the reflective plate, the at lest one heat conductive layer is made of a metallic material selected from silver (Ag), aluminum (Al), copper (Cu), or an alloy substantially composed of at least two of such metals, and a thickness of the at least one heat conductive layer is in the range from 100 nm to about 1,000 nm.

3. The backlight module as claimed in claim 1, further comprising a fan disposed at an end of the heat sink.

4. The backlight module as claimed in claim 1, wherein the at least one heat pipe is made of copper (Cu), aluminum (Al), iron (Fe), stainless steel, or an alloy substantially composed of at least two such metals.

5. The backlight module as claimed in claim 1, wherein a second side portion of the reflective plate has at least one cavity, and an end of the at least one heat pipe is received in the at least one cavity.

6. The backlight module as claimed in claim 1, wherein a diameter and a depth of each recess and a pitch between each two adjacent recesses axe each in the range from about 2 nm to about 50 nm.

7. The backlight module as claimed in claim 1, wherein a cross-section of each of the recesses taken along a direction perpendicular to the inner surface of the at least one heat pipe is generally rectangular, V-shaped, U-shaped, curved, arcuate, arc-shaped, or trapezoidal.

8. The backlight module as claimed in claim 1, wherein a nano-scaled particle layer is formed on the inner surface of the at least one beat pipe, the nano particles are made of a material selected from the group consisting of silicon (Si), silicon dioxide ($SiO_2$), aluminum trioxide ($Al_2O_3$), and an admixture substantially composed of at least two such materials, and a thickness of the nano-scaled particle layer is in the range from about 1 nm to about 20 nm.

9. The backlight module as claimed in claim 1, wherein the at least one heat pipe is closed at both ends thereof and has a vacuum airtight configuration with a working medium contained therein, and the working medium is selected from the group consisting of water, ammonia, methyl alcohol, acetone, and heptane.

10. The backlight module as claimed in claim 9, wherein a plurality of particles is suspended in the working medium, and the particles are made of copper, nanotubes, nanowires, nanoballs, or an admixture substantially composed of at least two such materials.

* * * * *